US008254779B2

(12) United States Patent
Carleton et al.

(10) Patent No.: US 8,254,779 B2
(45) Date of Patent: Aug. 28, 2012

(54) FIELD-CONFIGURABLE OPTICAL NETWORK TERMINAL DEVICE

(75) Inventors: William A. Carleton, Warminster, PA (US); Jinwoo Lee, Souderton, PA (US); Charles F. Niesley, Lansdale, PA (US); Frank J. Scullin, Philadelphia, PA (US); Kimberley A. Smedley, West Chester, PA (US)

(73) Assignee: General Instrument Corporation, Horsham, PA (US)

( * ) Notice: Subject to any disclaimer, the term of this patent is extended or adjusted under 35 U.S.C. 154(b) by 1152 days.

(21) Appl. No.: 11/836,526

(22) Filed: Aug. 9, 2007

(65) Prior Publication Data

US 2009/0041467 A1 Feb. 12, 2009

(51) Int. Cl.
*H04B 10/00* (2006.01)

(52) U.S. Cl. .................. 398/9; 398/16; 398/26; 398/30; 398/33; 398/34; 398/35

(58) Field of Classification Search .................... 398/58, 398/66
See application file for complete search history.

(56) References Cited

U.S. PATENT DOCUMENTS

| 5,267,122 | A | * | 11/1993 | Glover et al. .................. 361/704 |
| 5,594,576 | A | * | 1/1997 | Sutherland et al. ............. 398/58 |
| 5,661,585 | A | * | 8/1997 | Feldman et al. ................ 398/63 |
| 5,793,411 | A | * | 8/1998 | Hiraizumi ....................... 725/91 |
| 5,828,807 | A | * | 10/1998 | Tucker et al. .................. 385/135 |
| 5,903,372 | A | * | 5/1999 | Czerwiec ........................ 398/66 |
| 5,917,830 | A | * | 6/1999 | Chen et al. ..................... 370/487 |
| 6,362,908 | B1 | * | 3/2002 | Kimbrough et al. ........... 398/164 |
| 6,366,464 | B1 | * | 4/2002 | Cosley et al. .................. 361/752 |
| 7,120,236 | B1 | * | 10/2006 | Schneider ................. 379/201.01 |
| 7,171,121 | B1 | * | 1/2007 | Skarica et al. .................. 398/67 |
| 7,181,142 | B1 | * | 2/2007 | Xu et al. ......................... 398/66 |
| 2003/0117998 | A1 | * | 6/2003 | Sala et al. ...................... 370/351 |
| 2004/0172658 | A1 | | 9/2004 | Rakib et al. |
| 2004/0213286 | A1 | | 10/2004 | Jette et al. |
| 2004/0264961 | A1 | * | 12/2004 | Nam et al. ...................... 398/58 |
| 2005/0078422 | A1 | * | 4/2005 | Pincu et al. ..................... 361/62 |
| 2005/0091694 | A1 | * | 4/2005 | Rambo ......................... 725/110 |
| 2006/0067705 | A1 | | 3/2006 | Paulsen |
| 2006/0120723 | A1 | * | 6/2006 | Diouf et al. ..................... 398/71 |
| 2006/0198408 | A1 | * | 9/2006 | Park et al. ................... 372/38.02 |
| 2006/0282593 | A1 | * | 12/2006 | Crane et al. ................... 710/300 |
| 2007/0121619 | A1 | * | 5/2007 | Kimbrough et al. ........... 370/389 |
| 2007/0121638 | A1 | * | 5/2007 | Szczebak et al. ............. 370/394 |
| 2007/0133422 | A1 | * | 6/2007 | Su ................................. 370/248 |
| 2008/0037563 | A1 | * | 2/2008 | Bernard ........................ 370/401 |
| 2008/0232819 | A1 | * | 9/2008 | Mukai ............................ 398/168 |
| 2008/0270673 | A1 | * | 10/2008 | Sridhar et al. .................... 711/6 |
| 2009/0042536 | A1 | * | 2/2009 | Bernard et al. ................ 455/406 |
| 2010/0111537 | A1 | * | 5/2010 | Cheng et al. .................... 398/82 |

OTHER PUBLICATIONS

PCT International Search Report for PCT/US08/71665—dated Oct. 22, 2008.

* cited by examiner

*Primary Examiner* — Nathan Curs
*Assistant Examiner* — Tanya Ngo
(74) *Attorney, Agent, or Firm* — Lori Anne D. Swanson

(57) ABSTRACT

Described herein are systems and methods for a field-configurable optical network terminal (ONT) device at a subscriber to provide one or more communication services to the subscriber. The field-configurable ONT device is of a modular design operable for the insertion of additional communication modules or removal of existing communication modules from the ONT device for scaling the device to increased or decreased communication capacity as desired.

18 Claims, 5 Drawing Sheets

FIELD-CONFIGURABLE OPTICAL NETWORK TERMINAL DEVICE

BACKGROUND

Passive optical networks (PONs) are fast replacing hybrid fiber coaxial networks (HFCNs) as the communication topology of choice for service providers such as telephone, cable television, and Internet service providers. In a HFCN, a fiber optic cable is used to transmit optical signals between a central premise or office of a communication service provider (hereinafter, "service provider") and a fiber optic node located near a service subscriber or customer, such as a residential home subscribing to a telephone service, cable television (CATV) service, data (e.g., Internet) service, or any combination thereof. The fiber optic node employs powered or active components to receive and convert the optical signals into radio frequency (RF) signals for transmission via a coaxial cable to the subscriber's home. Like a HFCN, a PON is a point-to-multipoint communication network that uses a fiber optical cable to transmit optical signals. However, as its name implies, the PON employs non-powered or passive optical elements to provide optical signals from an optical line terminal (OLT) of the service provider to the service subscribers or customers without the need for a fiber optic node to perform optical-to-RF conversion. Each subscriber's home is equipped with an optical network terminal (ONT) apparatus or unit that provides the necessary optical-to-RF conversion to provide the subscriber with the subscribed telephone, CATV, and data services.

A conventional ONT unit is typically found mounted to the side of a subscriber's home and factory-configured to provide a fixed number of telephone lines, video feeds, and data lines to the subscriber's home. Thus, once the subscriber desires more telephone, video, or data lines than the ONT unit is capable of providing, the old ONT unit must be replaced with a new, more capable ONT unit. This problem is more prevalent in a multi-dwelling unit, such as an apartment building or a commercial business building with multiple tenants, wherein the number of communication or service lines (e.g., telephone, video, and data lines) periodically vary due to the constant migration of tenants in and out of such a premise. A typical solution to this problem is to initially provide an ONT unit that has more communication or service capacity than needed so as to accommodate any future increased need for communication lines. However, such a solution is not cost effective because it requires a more expensive upfront purchase and installation of a more-capable ONT unit that initially is not fully utilized and may or may not be fully utilized in the future.

SUMMARY

Described herein are embodiments for an ONT unit of a modular design that provides multiple subscribers with service connections for their telephony appliances (telephones, fax machines, modems, etc), video components (set top boxes, TVs, VCRs, etc.) and data networking equipments (switches, routers, gateways, etc.). The ONT unit includes one or more removable communication modules for providing multiple communication lines, such as telephone, video, and data lines. The modular design of the ONT unit provides it with the flexibility to be field configurable during its operation, as opposed to permanent factory-configured, to provide scalability for communication capacity. Thus, the scalable ONT unit is cost effective for an operator to purchase and configure with the requisite number of communication modules to provide the desired communication capacity (e.g., desired number of communication lines). The unit's modular design also enables the user to reconfigure the unit during its operation in the field by facilitating additional communication modules or removal of existing communication modules to accommodate a desire increase or decrease in communication lines.

Accordingly, in one embodiment, there is provided an optical network termination (ONT) device for deployment at a subscriber of at least one communication service provided via a fiber optic network, wherein the ONT device includes a first communication module that operates to provide the at least one communication service to the subscriber via the fiber optic network, a plurality of slots that operate to interface with the first communication module to provide the at least one communication service to the subscriber via the fiber optic network, a system controller module that operates to control the first communication module and any other communication module through the plurality of slots to effect the at least one communication service to the subscriber, and a backplane communication bus that operates to electrically connect the plurality of slots to the system controller module, and wherein the ONT device is field configurable to provide a decrease in a communication capacity of the at least one communication service to the subscriber through a removal of the first communication module from interfacing with at least one of the plurality of slots.

In another embodiment, there is provided a method for providing a scalable optical network terminal (ONT) device at a subscriber to provide at least one communication service to the subscriber via a passive optical network (PON), wherein the method includes implementing a plurality of communication modules in the ONT device to provide the at least one communication service to the subscriber via the PON, implementing a plurality of slots in the ONT device to interface with the plurality of communication modules, implementing a system controller module in the ONT device to control the plurality of communication modules through the plurality of slots to provide the at least one communication service to the subscriber via the PON, implementing a power supply module in the ONT device to provide power to the system controller module and the plurality of communication modules, and facilitating a removal of one of the plurality of communication modules to decrease a communication capacity of the ONT device to provide the at least one communication service.

In yet another embodiment, there is provided an optical network terminal (ONT) device having a computer-readable medium (CRM) therein to implement the aforementioned method.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Figure 1:
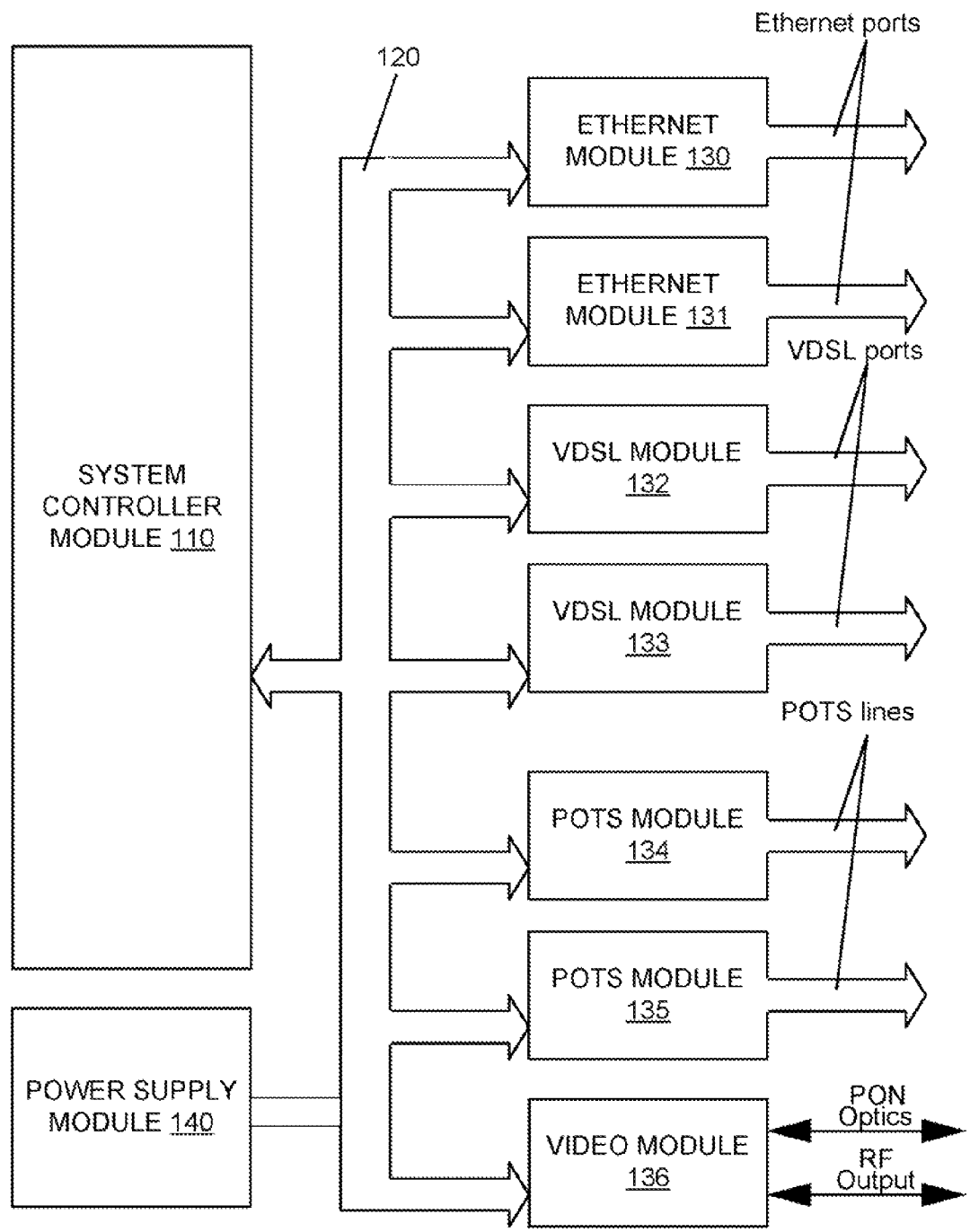
FIG. 1 illustrates a block diagram of an optical network terminal (ONT) unit having a modular design in accordance with one embodiment.

FIG. 1 illustrates a block diagram of an ONT unit or device 100 having a modular design in accordance with one embodiment. The ONT unit 100 includes a system controller card or module 110, a communication bus 120, a plurality of communication modules 130-136, and a power supply module 140. FIG. 1 illustrates the communication modules as Ethernet cards or modules 130 and 131, very high speed digital subscriber line (VDSL) cards or modules 132 and 133 for data lines, plain old telephone service (POTS) cards or modules 134 and 135 for telephone lines, and a video card or module 136 for video feeds. Each Ethernet module 130 or 131 provides a predetermined number of Ethernet ports (e.g., 8 Ethernet ports). Each VDSL module 132 or 133 provides a predetermined number of VDSL ports (e.g., 8 VDSL ports). Each POTS module 134 or 135 provides a predetermined number of POTS lines (e.g., 12 POTS lines). Thus, the ONT unit 100 may accept any complement of Ethernet, VDSL, and POTS modules to realize the desired number of Ethernet, VDSL, and POTS lines. For example, an operator from a telephone company may decide to populate the ONT unit 100 with only one POTS module and one Ethernet module for a small installation.

The ONT unit 100 is connected to a PON via a fiber optic cable to receive optical signals sent down from a service provider. Thus, in one embodiment, the video module 136 interfaces to the PON. It contains an optical transducer, such as a triplexer, that provides a single fiber interface for the multiple (e.g., three) wavelengths used on the PON. The triplexer demodulates the optical signals from the PON into downstream electrical signals and forwards the PON data as downstream electrical signals to the system controller module 110 for processing. Thus, the triplexer may include an analog detector, a data detector, an upstream laser, and a wave division multiplexer in a single assembly as understood in the art. The system controller 110 is connected to the communication modules 130-136 through the communication bus 120, which acts as a high speed backplane that also delivers power to the various components and modules in the ONT unit 100 from the power supply module 140. Thus, in addition to the desired communication modules 130-135, the system controller module 110, the video module 136, and the power supply module 140 are included in the ONT unit 110 for operation.

Accordingly, the system controller 110 processes the PON data, as received from the video module 136 via the communication bus 120, and forwards the downstream electrical signals to one of three other module types: Ethernet modules 130 and 131, VDSL modules 132 and 133, or POTS (voice) modules 134 and 135. For example, electrical signals for voice data is passed to each POTS module 134 or 135 via a time-division multiplexing (TDM) channel; electrical signals for Ethernet data or voice over Internet protocol (VoIP) is transferred to each Ethernet module 130 or 131 through use of a 1000Base-X data channel; and electrical signals for VDSL data (e.g., for Internet service) is transferred via a serialized Utopia Interface to each VDSL module 132 or 133. As for video data, electrical signals for such data are converted to RF signals directly on the video module 136 and output via, for example, a F connector. In an alternative embodiment, the RF conversion for video data may be performed by a dedicated video module, and the demodulation of the optical signals from the PON may be performed by a demodulation module separate from the video module.

The system controller module 110 also receives upstream data from each of the communication modules 130-135 and places that data on the PON via the video module 136 (or a separate module for modulation/demodulation optical signals to and from the PON) for transmission back to the optical line termination (OLT) at the service provider. Thus, the system controller 110 supports Ethernet data processing (for both data and VoIP) and/or VDSL (ATM) processing as desired by the service provider, wherein return path (upstream) demodulation for signals from the communication modules 130-133 is also performed as understood in the art. In one embodiment, the video module 136 includes its own return path demodulator that is operable to demodulate the return path RF signals for video data from a video component (e.g., set top box) and pass the demodulated data through the communication bus 120 to the system controller module 110, which then processes and inserts the data into the PON return traffic through the video module 136. The system controller module 110 further supports voice processing for the POTS modules 134 and 135. The POTS modules 134 and 135 provide a subscriber line interface that transmits and receives analog phone signals over existing in-home telephone wiring via a network interface device (NID) as further described below. The system controller module 110 then takes the analog voice stream and converts it to data packets for further processing, whereby the voice stream passes to a Codec that converts the analog signal to digital if being sent to a digital signal processor (DSP) on the system controller module 110 and digital to analog if sent from the DSP. The DSP packetizes the voice stream for transmission by the video module 136 and depacketizes received data from the video module 136 for conversion back to analog to send to the NID. The DSP also detects tones, such as dual tone multifrequency (DTMF), generates tones such as busy tones, detects dial tones, and eliminates echoes generated in the loop between the subscriber line interface and the telephone.

Figure 2:
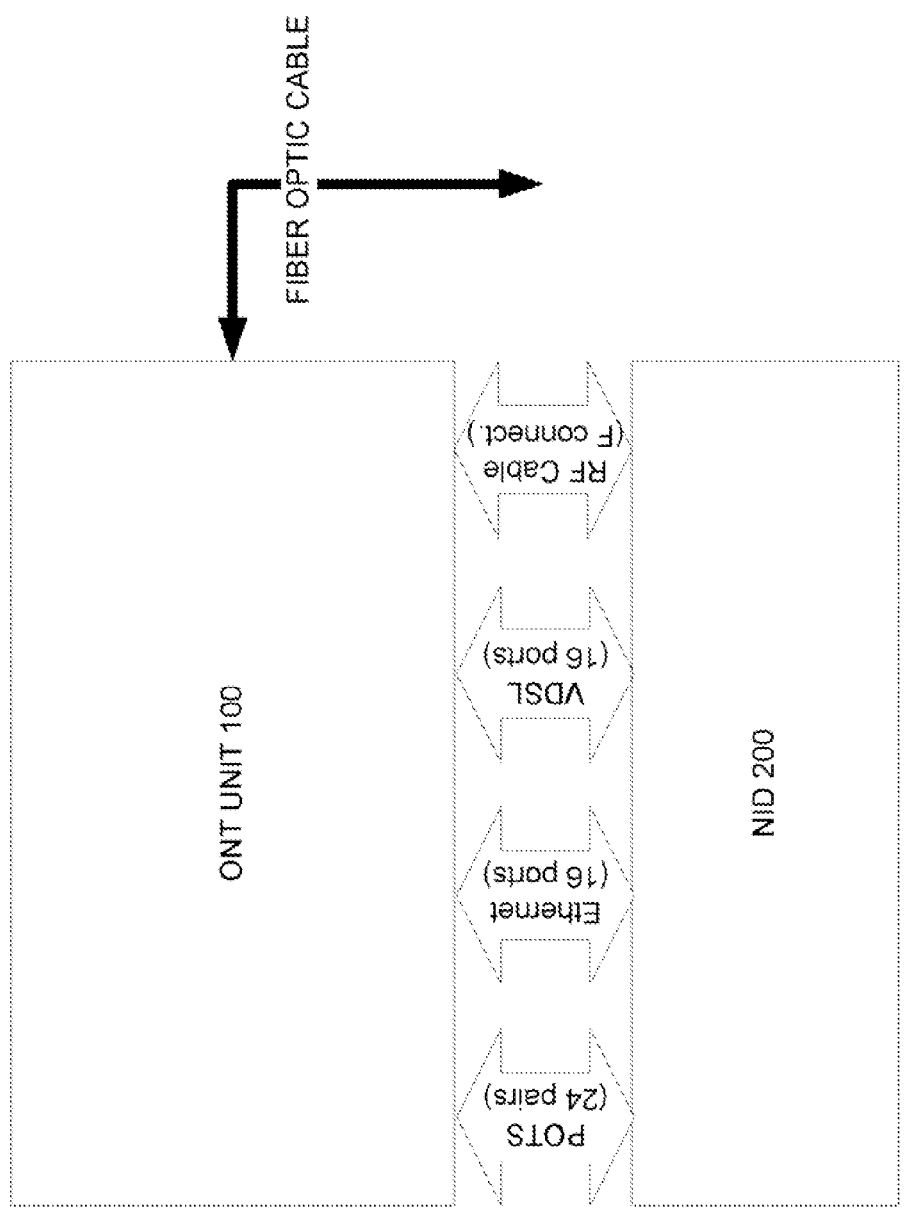
FIG. 2 illustrates the connection between an ONT unit and a network interface device (NID), in accordance with one embodiment.

The ONT unit 100 is connected to a NID that is typically installed in the basement, first floor telco room, garage, or outside the subscriber's premise to provide outputs of the communication modules 130-136 to the NID. FIG. 2 illustrates the connection between the ONT unit 100 and a separate NID 200. Alternatively, the NID 200 may be housed in the ONT unit 100 but kept separate from the rest of the ONT unit 100. The NID 200 houses the customer interfaces that perform the typical code conversion, communication protocol conversion, and buffering required for voice, video, and data communication to and from the PON. It represents the demarcation point of the service provider, whereby its network ends and connects with the wiring at the subscriber's premise.

Figure 3:
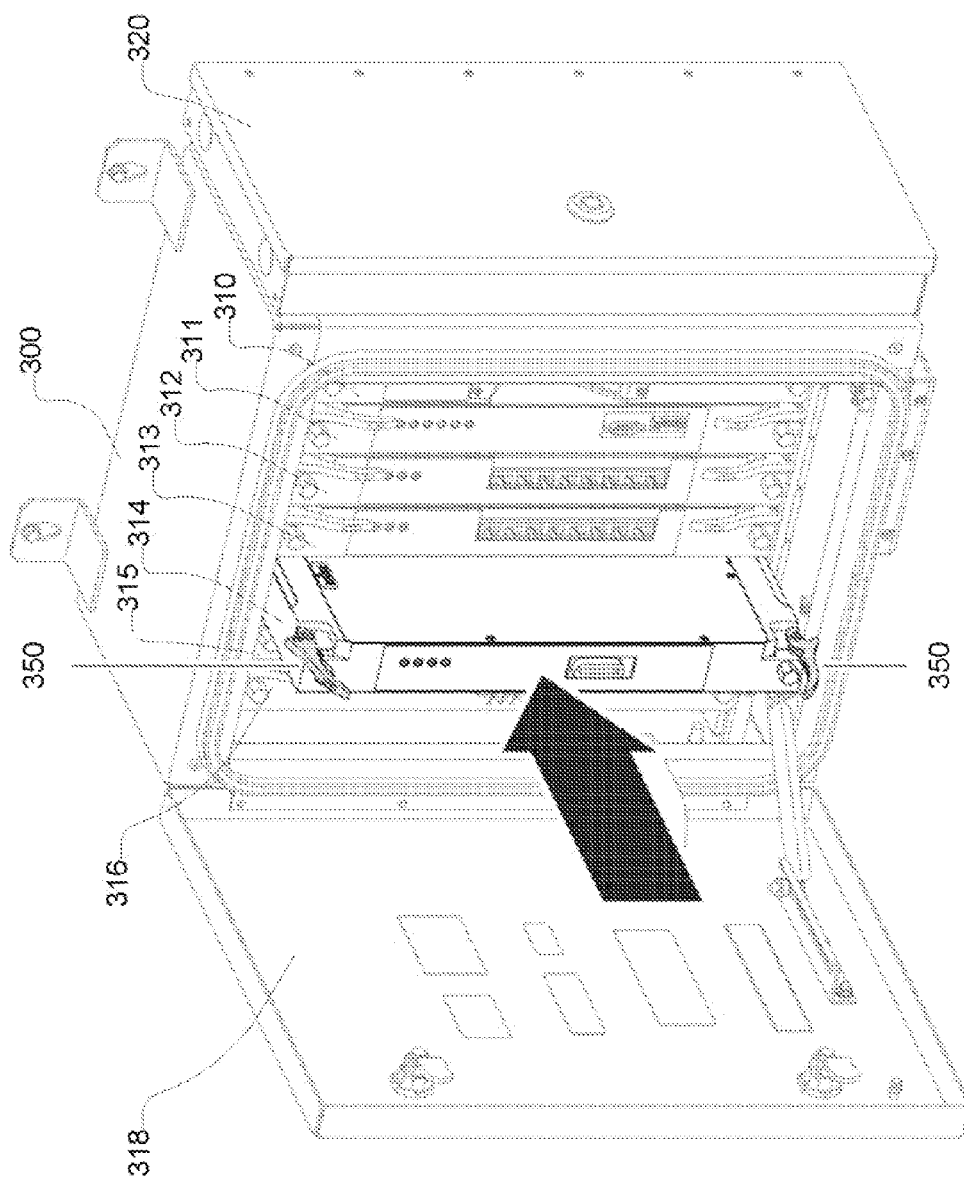
FIG. 3 illustrates a modular platform for an ONT unit, in accordance with one embodiment.

FIG. 3 illustrates a modular platform 300 for the ONT unit 100, in accordance with one embodiment. The platform 300 includes multiple easy access slots for inserting and removing multiple cards or modules 310-316. As illustrated, the slots are populated by a video module 310 (corresponding to the video module 136), a system controller card 311 (corresponding to the system controller module 110), two Ethernet or VDSL cards 312 and 313 (corresponding to the Ethernet modules 130, 131 or VDSL modules 132, 133), two POTS or voice cards 314 and 315 (corresponding to POTS modules 134, 135), and a power supply module 316 (corresponding to the power supply module 140). Each slot may include a pair of injector arms 350 for securing a card in place. Although FIG. 3 illustrates only seven slots for populating seven modules, it should be understood that the platform 300 may include any number of slots as desired or feasible. A cover 318 is provided to protect the platform 300 and components therein, and it also may be used to prevent unauthorized access to the ONT unit. FIG. 3 also illustrates a fiber storage enclosure 320 attached to the right side of the modular platform 300 to store the fiber optic cable that provides connection of the platform 300 to the PON (e.g., via a NID).

The ONT 100 is operable to allow communication or line modules 312-315 (i.e., communication modules 130-136) to be added or removed while power is applied to the ONT 100 from the power supply module 316. In one embodiment, the system controller module 311 (or module 110) is operable to detect the presence, addition, and removal of the line modules 312-315. A module-detect interrupt signal from each slot in the platform 300 may alert the system controller module 311 to a removal or insertion event. At start-up of the ONT unit, the system controller module 311 polls the module detect interrupt signals to determine the device complement populating the slots of the ONT unit.

Figure 4:
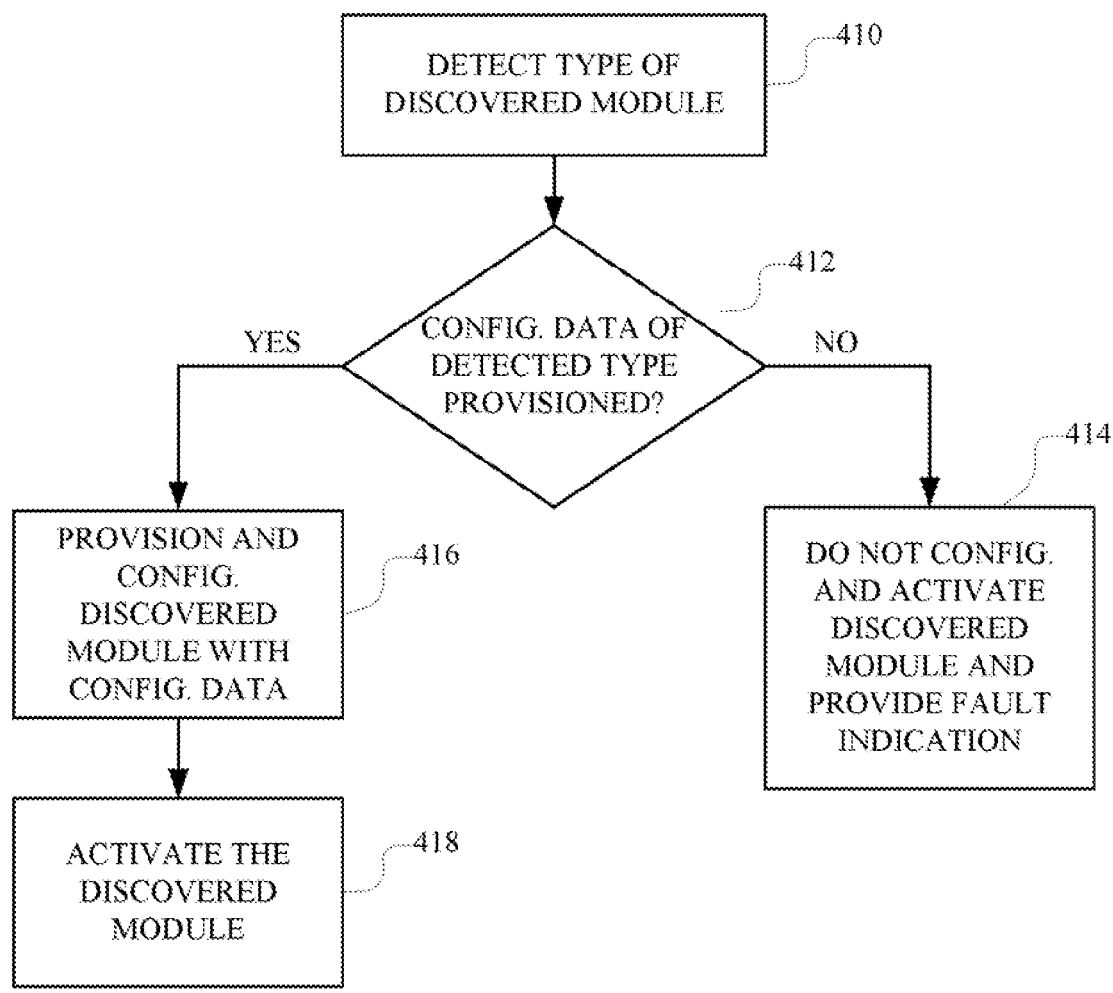
FIG. 4 illustrates a process for module discovery in an ONT unit, in accordance with one embodiment.

FIG. 4 illustrates a process 400 for module discovery by the system controller module 311 once a module is inserted or discovered at start-up. The system controller module 311 also performs this process after a slot has been provisioned for a previously-detected but unexpected module. For illustrative purposes only and not to be limiting thereof, the method 400 is discussed in the context of the ONT unit 300 (FIG. 3).

At 410, the system controller module 311 detects the type of line module that has been inserted or discovered by reading the module type from the module's memory, such as an electrically erasable programmable read-only memory (EEPROM).

At 412, the system controller module 311 determines whether it has been provisioned with configuration data for the discovered module and whether the module type matches the configuration data.

At 414, if the discovered module is not of a type expected or provisioned by the configuration data of the system controller module 311, the system controller module 311 will not configure and activate the discovered module. If the discovered module includes a visual indicator for fault, such as a fault LED, the system controller module 311 may also illuminate such a LED to indicate a failure to configure and activate the discovered module.

At 416, however, if the system controller module 311 has been provisioned with configuration data for the discovered module and the module type matches the configuration data, the system controller module 311 proceeds to provision and configure the discovered module for activation. If necessary the system controller module 311 may download the requisite firmware to the discovered module.

At 418, the system controller module 311 activates the discovered module and allow traffic to pass through the discovered module. For example, if the discovered module is an Ethernet module, the serializer/deserializer (SERDES) for the slot is activated. If the discovered module is a VDSL module, a serial utopia bus for the slot is activated. If the discovered module includes a visual indicator for activation, such as an active light-emitting diode (LED), the system controller module 311 may also illuminate such a LED.

Figure 5:
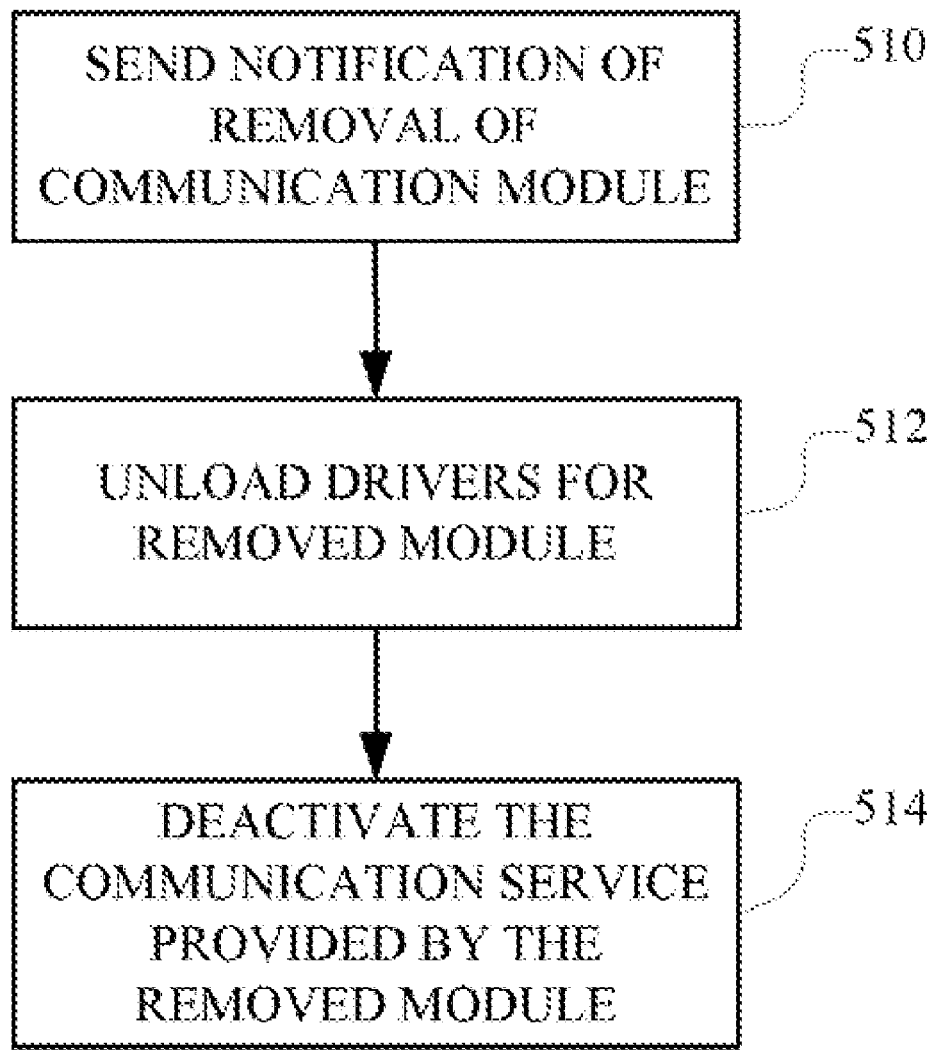
FIG. 5 illustrates a process for module removal from an ONT unit, in accordance with one embodiment.

FIG. 5 illustrates a process 500 performed by the system controller module 311 for module removal when a module is removed from its slot in the ONT unit, as detected by the aforementioned detect-interrupt signals. The system controller module 311 also performs this process after a slot has been provisioned for a different module than previously expected (thus, removal is desired). For illustrative purposes only and not to be limiting thereof, the method 400 is discussed in the context of the ONT unit 300 (FIG. 3).

At 510, the system controller module 311 sends a notification through the PON to the service provider to indicate that the module has been removed.

At 512, any software drivers or applications for the removed module is unloaded from the system controller module 311.

At 514, the system controller module 311 deactivates communication services to the removed module. For example, if an Ethernet module is removed, the system controller module 311 proceeds to deactivate the 1000Base-X bus output to that module. If a VDSL module is removed, the SERDES bus to that module is deactivated. If a video module is removed, the system controller module 311 proceeds to deactivate the RF power enable control line. This is done to ensure that RF power will be initially off when a video module is inserted into the ONT unit 300 later. The system controller module 311 also disables the addressable tap power applied to the RF output.

To perform the processes 400 and 500 and other functions described above, the system controller module 311 (or 110) includes one or more programmable logic devices, such as one or more field programmable gate arrays (FPGAs) or processors of any of a number of computer processors, such as processors from Intel, AMD, or Cyrix. Each programmable logic device is coupled to or includes at least one memory device, such as a computer readable medium (CRM), that is also included in the system controller module 311. The processor is operable to execute computer-executable program instructions stored in the CRM, such as program code of applications, to run the applications. The computer-executable program instructions include code from any suitable computer-programming language, such as C, C++, C#, Java, or the like. Thus, for example, the CRM may store computer-executable program instructions for execution by the programmable logic device to perform the processes 400 and 500 and other functions of the system controller module 311 as described above. Examples of a CRM include but are not limited to an electronic, optical, magnetic, or other storage or transmission device capable of providing a programmable logic device with computer-readable instructions. Other examples of a suitable CRM include, but are not limited to, a floppy disk, CD-ROM, DVD, magnetic disk, memory chip, ROM, RAM, an ASIC, a configured processor, any optical medium, any magnetic tape or any other magnetic medium, or any other medium from which a programmable logic device is operable to read instructions.

The various embodiments of an ONT unit as described herein are field configurable to accommodate any desired number of communication lines, and they are scalable to adjust to a future desire or need to increase or decrease the number of communication lines. Accordingly, such an ONT unit provides a more cost-effective solution for both communication service providers and subscribers to set up communication via a fiber optic network such as a PON.

What has been described and illustrated herein are various embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims, and their equivalents, in which all terms are meant in their broadest reasonable sense unless otherwise indicated.

What is claimed is:

1. An optical network termination (ONT) device for deployment at a subscriber of at least one communication service provided via a fiber optic network, the device comprising:
   a first communication module that operates to provide the at least one communication service to the subscriber via the fiber optic network;
   a plurality of slots that operate to interface with the first communication module to provide the at least one communication service to the subscriber via the fiber optic network;
   a system controller module that operates to control the first communication module and any other communication module through the plurality of slots to effect the at least one communication service to the subscriber; and
   a backplane communication bus that operates to electrically connect the plurality of slots to the system controller module;
   wherein the ONT device is field configurable to provide a decrease in a communication capacity of the at least one communication service to the subscriber through a removal of the first communication module from interfacing with at least one of the plurality of slots, and to facilitate an addition of at least one new communication module other the plurality of communication modules to increase a communication capacity of the ONT device to provide the at least one communication service,
   wherein facilitating an addition of one or more communication modules comprises:
   determining that the at least one new communication module is interfacing with one of the plurality of slots in the ONT device;
   detecting a type of the at least one new communication module based on a communication service provided by the at least one new communication module;
   determining whether the implemented system controller module is provisioned with configuration data for the detected type of the at least one new communication module; and upon the determining that the implemented system controller module lacks the configuration data for the detected type of the at least one new communication module, provides an indication of a failure to configure and activate the at least one new communication module.

2. The ONT device of claim 1, wherein the ONT device is further field configurable to provide an increase in the communication capacity of the at least one communication service to the subscriber through one of: a) a re-interfacing of the first communication module with one of the plurality of slots, and b) an interfacing of both the first communication module and a second communication module with two of the plurality of slots.

3. The ONT device of claim 1, wherein the at least one communication service includes at least a voice communication service, a data communication service, and a video service.

4. The ONT device of claim 3, wherein the at least one communication service comprises a first communication service and a second communication service that are different from each other.

5. The ONT device of claim 4, wherein the first communication module operates to provide the first communication service to the subscriber via the fiber optic network, and a second communication module operates to provide the second communication service to the subscriber via the fiber optic network.

6. The ONT device of claim 4, wherein the first and second communication modules operate to provide the first communication service to the subscriber via the fiber optic network.

7. The field-configurable ONT device of claim 1, wherein the fiber optic network is a passive optical network (PON).

8. The ONT device of claim 1, wherein the subscriber is a multi-dwelling unit.

9. The ONT device of claim 1, wherein the system controller module is operable to interface with any one of the plurality of slots to control any other communication module interfaced with another one of the plurality of slots.

10. The ONT device of claim 1, further comprising a power supply module that is operable to interface with any one of the plurality of slots to provide power to the system controller module and any other communication module interfaced with another one of the plurality of slots.

11. The ONT device of claim 1, wherein the at least one communication service includes a video communication service, and the first communication module operates to provide the video communication service to the subscriber via the fiber optic network and to provide a demodulation of optical signals from the fiber optic network for both the first communication module and a second communication module.

12. The ONT device of claim 1, wherein:
   the at least one communication service includes a video communication service, and the first communication module operates to provide the video communication service to the subscriber via the fiber optic network; and
   the ONT device further comprises a third communication module that operates to provide a demodulation of optical signals from the fiber optic network for both the first communication module and a second communication module.

13. The ONT device of claim 1, wherein the at least one communication service includes a phone communication service, and the first communication module provides multiple phone lines for the phone communication service.

14. The ONT device of claim 1, wherein the at least one communication service includes a data communication service, and the first communication module provides either multiple Ethernet data ports or digital subscriber line (DSL) ports for the data communication service.

15. A method for providing a scalable optical network terminal (ONT) device at a subscriber to provide at least one communication service to the subscriber via a passive optical network (PON), the method comprises:
   implementing a plurality of communication modules in the ONT device to provide the at least one communication service to the subscriber via the PON;
   implementing a plurality of slots in the ONT device to interface with the plurality of communication modules;
   implementing a system controller module in the ONT device to control the plurality of communication modules through the plurality of slots to provide the at least one communication service to the subscriber via the PON;

implementing a power supply module in the ONT device to provide power to the system controller module and the plurality of communication modules;

facilitating a removal of one of the plurality of communication modules to decrease a communication capacity of the ONT device to provide the at least one communication service, facilitating an addition of at least one new communication module other the plurality of communication modules to increase a communication capacity of the ONT device to provide the at least one communication service, wherein facilitating an addition of one or more communication modules comprises:

determining that the at least one new communication module is interfacing with one of the plurality of slots in the ONT device;

detecting a type of the at least one new communication module based on a communication service provided by the at least one new communication module;

determining whether the implemented system controller module is provisioned with configuration data for the detected type of the at least one new communication module; and upon the determining that the implemented system controller module lacks the configuration data for the detected type of the at least one new communication module, provides an indication of a failure to configure and activate the at least one new communication module.

16. The method of claim 15, wherein facilitating an addition of one or more communication modules further comprises:

upon the determining that the implemented system controller module is provisioned with configuration data for the detected type of the at least one new communication module, configure and activate the at least one new communication module to provide the at least one communication service.

17. The method of claim 16, wherein facilitating a removal of at least one of the plurality of communication modules comprises:

determining that at least one of the plurality of communication modules is removed from interfacing with one of the plurality of slots in the ONT device;

providing a notification of the removal of the removed communication module;

removing an application for the removed module from the implemented system controller module; and deactivating a communication service as previously provided by the removed module when interfaced with one of the plurality of slots in the ONT device.

18. An optical network terminal (ONT) device having a non-transitory computer readable medium (CRM) therein to provide at least one communication service to the subscriber via a passive optical network (PON), and encoded on the CRM is computer-executable programming code executed by a programmable logic device to:

implement a plurality of communication modules in the ONT device to provide the at least one communication service to the subscriber via the PON;

implement a plurality of slots in the ONT device to interface with the plurality of communication modules;

implement a system controller module in the ONT device to control the plurality of communication modules through the plurality of slots to provide the at least one communication service to the subscriber via the PON;

implement a power supply module in the ONT device to provide power to the system controller module and the plurality of communication modules;

facilitate a removal of one of the plurality of communication modules to decrease a communication capacity of the ONT device to provide the at least one communication service; and facilitate an addition of at least one new communication module other the plurality of communication modules to increase a communication capacity of the ONT device to provide the at least one communication service, wherein facilitating an addition of one or more communication modules comprises:

determining that the at least one new communication module is interfacing with one of the plurality of slots in the ONT device;

detecting a type of the at least one new communication module based on a communication service provided by the at least one new communication module;

determining whether the implemented system controller module is provisioned with configuration data for the detected type of the at least one new communication module; and upon the determining that the implemented system controller module lacks the configuration data for the detected type of the at least one new communication module, provides an indication of a failure to configure and activate the at least one new communication module.

\* \* \* \* \*